(12) United States Patent
Barazza

(10) Patent No.: US 6,705,734 B1
(45) Date of Patent: Mar. 16, 2004

(54) OPTIC SYSTEM OF ILLUMINATION FOR VIDEOPROJECTOR

(75) Inventor: Giorgio Barazza, Pordenone (IT)

(73) Assignee: SIM2 Multimedia S.p.A., Pordenone (IT)

( * ) Notice: Subject to any disclaimer, the term of this patent is extended or adjusted under 35 U.S.C. 154(b) by 0 days.

(21) Appl. No.: 10/129,300

(22) PCT Filed: Nov. 3, 2000

(86) PCT No.: PCT/IB00/01591
§ 371 (c)(1),
(2), (4) Date: Oct. 23, 2002

(87) PCT Pub. No.: WO01/33865
PCT Pub. Date: May 10, 2001

(30) Foreign Application Priority Data

Nov. 5, 1999 (IT) .......................................... TO99A0954

(51) Int. Cl.[7] .............................................. G03B 21/28
(52) U.S. Cl. .............................. 353/98; 353/34; 348/771
(58) Field of Search ............................. 353/31, 33, 34, 353/37, 98, 99, 100; 348/742, 743, 771

(56) References Cited

U.S. PATENT DOCUMENTS

| | | | | |
|---|---|---|---|---|
| 5,798,819 A | * | 8/1998 | Hattori et al. ................. | 353/33 |
| 5,816,675 A | * | 10/1998 | Brice et al. .................... | 353/31 |
| 5,918,961 A | * | 7/1999 | Ueda ............................ | 353/20 |
| 6,174,060 B1 | * | 1/2001 | Imaoka et al. ................. | 353/31 |
| 6,404,558 B1 | * | 6/2002 | Chuang et al. ............. | 359/634 |
| 6,457,828 B1 | * | 10/2002 | Hayashi ....................... | 353/20 |
| 6,585,378 B2 | * | 7/2003 | Kurtz et al. ................... | 353/31 |

\* cited by examiner

Primary Examiner—William C. Dowling
(74) Attorney, Agent, or Firm—Levine & Mandelbaum

(57) ABSTRACT

Illumination system for a videoprojector, which comprises a lighting lamp (1) emitting a light beam on a first optical axis (AB) and a projection lens (10) crossed by said light beam along a second optical axis (DE), said first optical axis (AB) and second optical axis (DE) not being substantially parallel to each other and respectively pertaining to a first plane (P1) and second plane (P2), said light beam being guided along an optical path by optic deflecting means (6; 11, 11'), which shift it from the first plane (P1) to the second plane (P2) and optic handling means (7, 8, 97, 8, 9; 12, 9', 9, 9''') shifting it from the first optical axis (AB) to the second optical axis (DE), said optic handling means (7, 8, 9; 7, 8, 9, 12, 9', 9, 9''') comprising an image forming device (9). According to the invention the geometric projection of the optical path on the first plane (P1) comprises a closed path (BB'CDX).

16 Claims, 4 Drawing Sheets

OPTIC SYSTEM OF ILLUMINATION FOR VIDEOPROJECTOR

The present invention relates to an optic system of illumination for a videoprojector based on DMD (Digital Micromirror Device) technology.

Videoprojection systems based on DMD (Digital Micromirror Device) technology are increasingly spreading, above all for the excellent image quality they are able to obtain, in particular for the brightness and resolution of the image itself, and also for their smaller projectors sizes compared e.g. to the devices utilizing kinescopes. A DMD device consists essentially of a set of aluminum square mirrors, with a side of micrometric size, e.g. 16 μm, each one associated to an element of the image to be projected. i.e. to a pixel. Said mirrors can have a small angle rotation around a diagonal, such as ±10 degrees, where rotation in either direction is produced by two electrodes located under the mirror in opposite positions with respect to the rotating axis. Therefore, the light hits the mirror with an angle of about 20 degrees with respect to the perpendicular to the mirror plane when the latter is in its "rest" condition, i.e. not attracted by any of the two electrodes. If the mirror is rotated in one direction, the reflected ray undergoes a deflection that does not affect in the projection lens and therefore, it is not sent to the screen. Therefore, the corresponding pixel is "off". If rotation occurs in the opposite direction the pixel is "on", since the reflected light affects on the projection lens and is sent to the screen.

To each pixel of the image is associated a cell of a static memory of the type SRAM (Static Random Access Memory), containing the information for directing the electrodes that cause mirror rotation. Even if the reflected light always has the same intensity, changing the time during which a pixel remains "on", is obtained the effect of a luminosity change due to the integrating action produced by the human eye. A videoprojector may comprise only one DMD device, in which case its mirrors are illuminated sequentially by the three primary colours, i.e. red, green and blue, which are obtained sending the light of the lighting lamp to a revolving wheel, called colour wheel, divided in at least 3 segments, each one consisting of a dichroic filter, i.e. selective with respect to the wavelength, related to one of the 3 primary colours. Wheel rotation causes the light beam sent to the DMD device to take all three different colours sequentially. In the event, vice-versa, of a videoprojector with three DMD devices, the light of the lighting lamp is split in the three colours by a prism, and each colour is sent to a different DMD device.

In a DMD videoprojector, the choice of the optic system of illumination has taken on particular importance, since both the dimensions and utilization procedures of the videoprojector itself depend on it.

A first known illumination system is illustrated in FIG. 1 by means of a basic diagram. This basic diagram is plotted assuming that a videoprojector 21 is placed in horizontal position for frontal projection to a vertical screen 22, and therefore, said diagram corresponds to a plan view of said videoprojector 21: this premise applies to all subsequent figures, unless otherwise specified. Moreover, for clarity's sake, the blocks indicated with the same reference number in the various figures have the same function. With reference number 1 is indicates a lighting lamp with a parabolic reflector, number 2 indicates an aspheric condenser focusing the light at the input of an integrating rod 4 consisting of an optic glass parallelepiped, whose function is to obtain a uniform light beam from the lighting lamp 1. The integrating rod 4 is preceded by a colour wheel 3, which, as said above, allows the reproduction of the colours through its dichroic filters in those videoprojectors using only one DMD device, as in the example of FIG. 1. In some instances, the distance from the lighting lamp 1 to the colour wheel 3 is closed by a collector, not shown in the figure, whose purpose is to hinder that reflected rays are spread in the surrounding space illuminating the environment The output light from the integrating rod 4 is collected by a lens system, in the specific instance three converging lenses, known as relay lens, and indicated collectively with the reference number 5. Said lenses 5, along with a mirror 6 and a prism 7 convey the light emitted by the lighting lamp 1 towards an image microforming device. i.e. a DMD device, indicated with number 9, on which is formed an focused image which is enlarged with respect to the one at the output of the integrating rod 4. This illumination diagram, in which the focusing occurs on the image microforming device 9, is known as a critical or Abbe's illumination. The optical path from the lighting lamp and the image microforming device 9 undergoes two deflections: a first deflection due to the reflecting surface of the mirror 6; and a second deflection due to the prism 7. Said prism 7 conveys the light beam towards the image microforming device 9 with an angle of about 20 degrees, as requested by the manufacturer's specifications for the image microforming device 9. The prism 7 is a common prism, such as TIR (Total Internal Reflection), i.e. operating with full reflection, for the presence of an air layer of about 10 μm separating it from a second prism indicated with reference number 8. Said prism 8 deflects the light beam coming from the micromirrors on the surface of the image microforming device 9 towards a projection lens indicated with the reference number 10, which projects the image on a vertical screen 22.

A dotted line in FIG. 1 also indicates the optical path of the light beam emitted by the lighting lamp 1. A first segment AB, directed along the illumination axis of the lighting lamp 1, departs from a point A in line with said illumination lamp 1 to reach a point B in line with the mirror surface 6. Said first segment AB lies in a first plane indicated with P1 in FIG. 1a, where a basic perspective view of the optical path is reported within the videoprojector 21.

Then the light beam is deflected upwards by the mirror 6, as it can be clearly noticed in FIG. 1a, and reaches a point C pertaining to a second plane P2 located on the prism 7, wherefrom it is reflected to a point D pertaining to the surface of the image microforming device 9. As mentioned above, the image is formed by the image microforming device 9 modulating the light beam. Finally, said modulated light beam reaches a point E directly outside of the projection lens 10, i.e. identifying a projection segment DE, which is part of the projection axis. The extension of the segment DE reaches the screen 22.

It should be noticed that the mirror 6 deflects the optical path upwards along the segment BC, i.e. it is inclined, appearing in the plan view like a rectangle instead of a segment. The above deflection is quite a significant one to prevent that any large sized components, such as the prisms 7 and 8 and the image microforming device 9, bearing an associated rather voluminous piloting card not shown in FIG. 1, may interfere with the optical path of the light beam along the segment AB and/or the integrating rod 4. This illumination system may also be used in a mirror back projection configuration. i.e. the configuration where the image is projected upwards, since the illumination axis of the lighting lamp 1 is horizontal and substantially perpendicular to the projection axis and therefore, placing the videoprojector 21 upright, so that the projection lens 10 sending the image upwards, not change the position of the lighting lamp 1, which, in the position illustrated in FIG. 1, is in its optimal condition for heat dissipation, warranting a long service life of the videoprojector 21.

However, the illumination system for a videoprojector according to FIG. 1 has the drawback of excessive overall dimensions, particularly for its height, which is due, as mentioned above, to large sized components arranged either above or near to the segment AB of the optical path.

A basic diagram of a second known illumination system of a videoprojector 31 is represented in the configuration of FIG. 2. The optical path, represented by the dotted line extending through the points ABB'CDE, is deflected by three reflecting surfaces, indicated respectively with the reference numbers 6', 6'', 6'''; the surfaces 6' and 6'' reflect the optical path downwards, whereas the surface 6''', reflects it upwards. As it can be noticed, the development of the optical path is such that no interference problems exist with the larger components. This allows to have more restricted height dimensions with respect to the solution of FIG. 1. With this system, the light beam is focused on the input of the projection lens 10 instead of the image microforming device 9, according to the known Kohler configuration; the reflecting surface 6''' will provide a correct angle shot of the optical beam sent to the image microforming device 9, whereby both prisms 7 and 8 of FIG. 1 are not required; the set of the three lenses or relay lens indicated with the reference number 5 provide for the image focusing.

However, the system of FIG. 2 cannot be used in a mirror back projection configuration, this is due to the fact that the lamp axis, coinciding with the segment AB, is horizontal but not substantially perpendicular to the projection axis represented by the segment DE, therefore, should the videoprojector 31 be positioned upright, as requested for a mirror back projection, the lamp axis would be inclined upwards, in which case the lamp cannot ensure optimal heat dissipation and a considerable shorter life would result.

A further drawback for the system represented in FIG. 2 is due to the fact that the image focused on the projection lens input is smaller, since the light rays from the image microforming device 9 are converging rays, so the projection lens 10 cannot be shifted vertically, as a portion of the light beam from the image microforming device 9 would go lost; as a result, the image position cannot be adjusted on the screen, i.e. there is no possibility of performing a so-called vertical offset.

Therefore, common illumination systems have several drawbacks, the most significant ones being their big size, the impossibility of using the videoprojector in all possible configurations (frontal, ceiling projection, back projection) and adjusting the upright image position (so-called offset). In particular, in the mirror back projection widely used in television sets with a screen over 40", the videoprojector is positioned upright and send the light beam upwards to a mirror, which will reflect it back on the screen, with ensuing cooling problems for the lamp.

It is the aim of the present invention to provide an optic system of illumination for videoprojectors, which can solve the above drawbacks and allows the manufacture of videoprojectors with restricted dimensions and usable in any configuration. In order to achieve such aims, it is the object of the present invention an optic system of illumination incorporating the features of the annexed claims, which form an integral part of the description herein.

Further objects, features and advantages of the present invention will become apparent from the following detailed description and annexed drawings, which are supplied by way of non limiting example, wherein.

Figure 2:
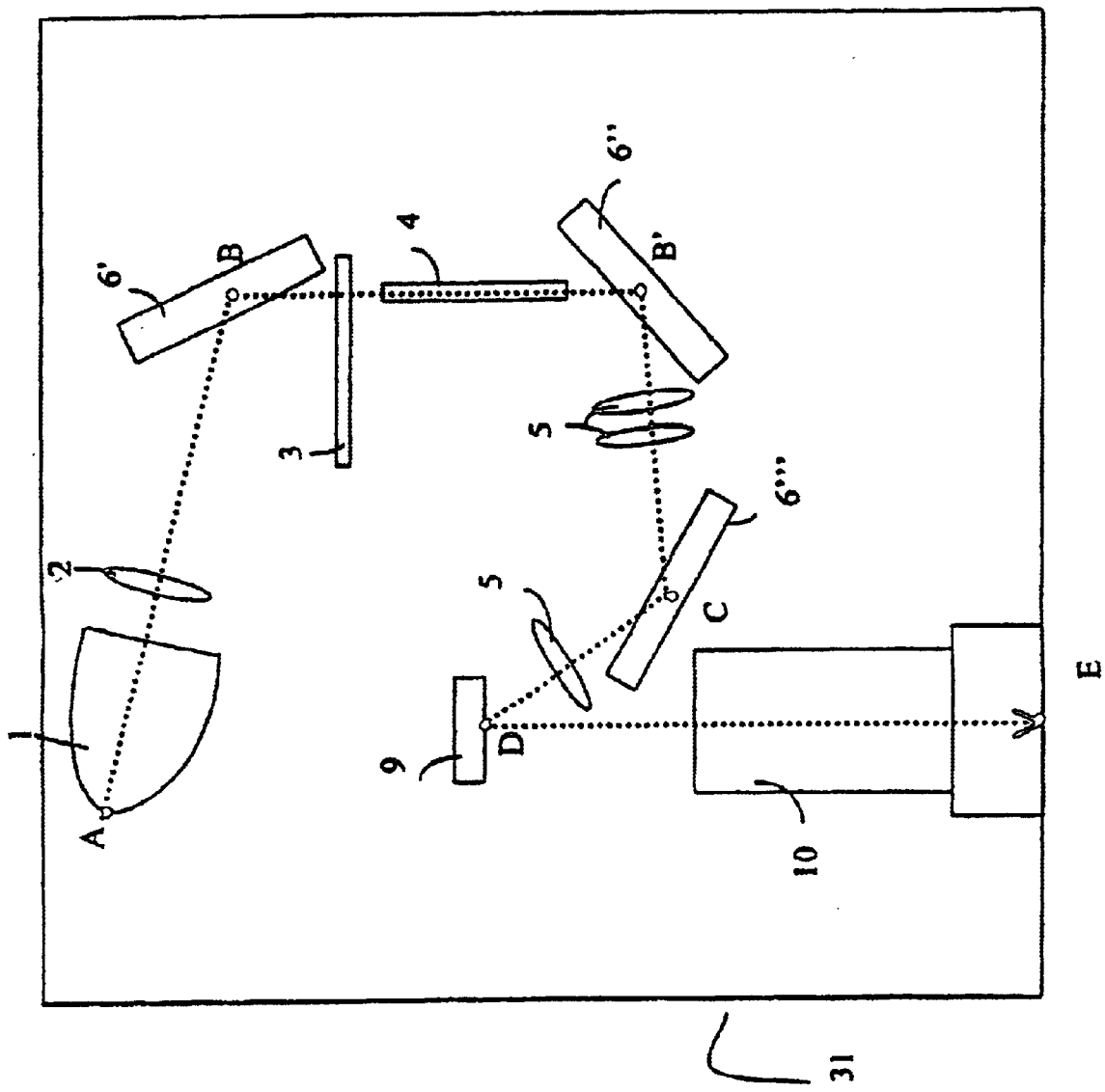
FIG. 2 shows a schematic plan view of a second known illumination system.
Figure 3A:
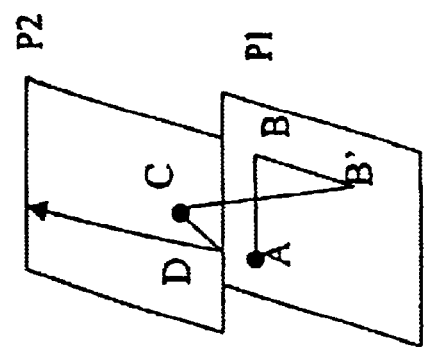
FIG. 3a shows a schematic perspective view of the optical path of the illumination system of FIG. 3.
Figure 3:
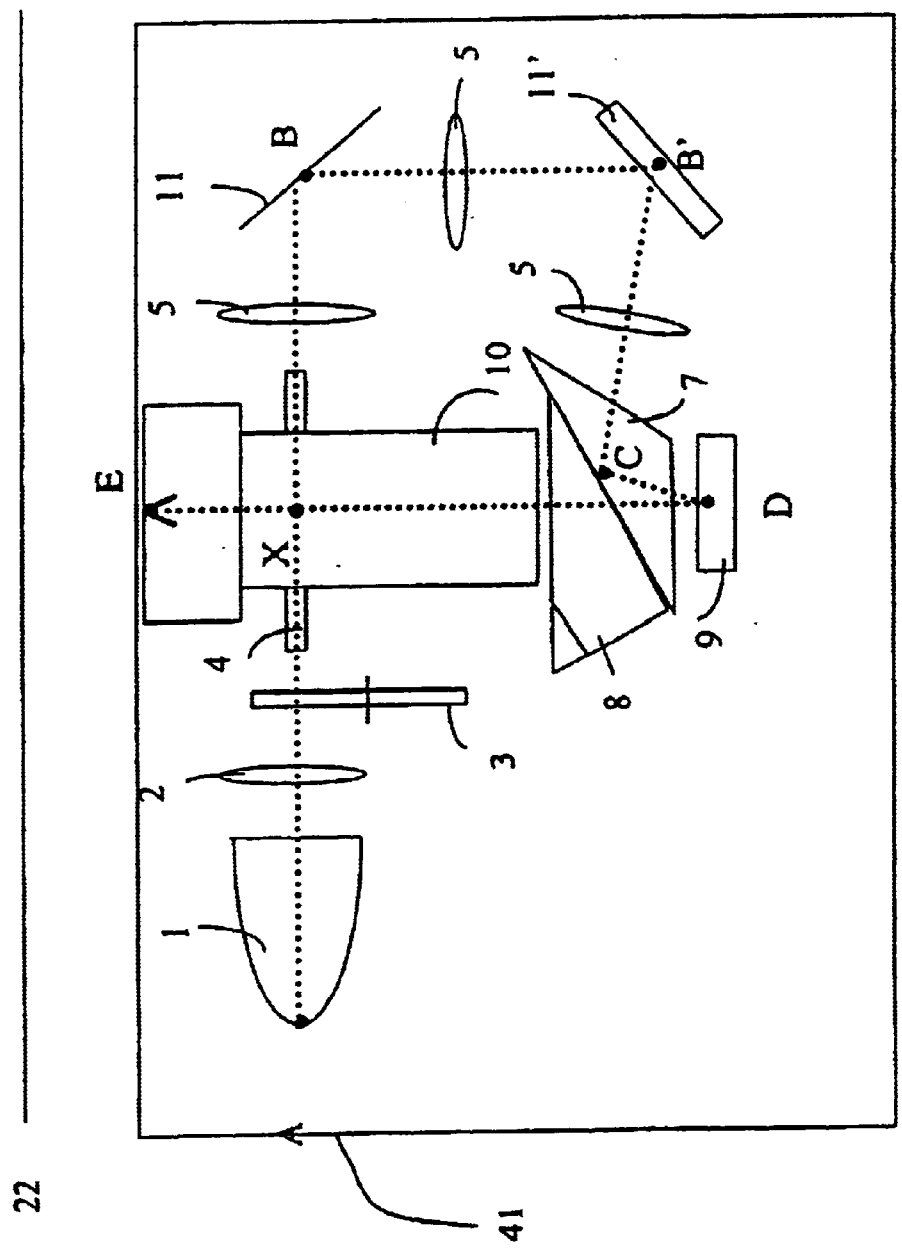
FIG. 3 shows a schematic plan view of an illumination system according to the present invention.

With reference to FIG. 3, it is represented an optic system of illumination for videoprojection systems based on DMD technology, according to the invention. As said, the blocks of FIG. 3 bearing the same reference numbers of the blocks in FIG. 1 and FIG. 2, perform the same functions previously described.

The videoprojector 41 illustrated in FIG. 3, has an optical path outlined by the dotted line extending through the points ABB'CDE, which undergoes a first deflection due to a first reflecting surface 11, such as a mirror, placed perpendicularly to the plane P1. Therefore, the segments AB and BB' are both parallel to the horizontal plane and belong to the plane P1 illustrated in the perspective view of FIG. 2a. A second deflection of the optical path is caused by a second reflecting surface 11', inclined upwards, whereby in FIG. 3 its projection on a horizontal plane is represented by a rectangle instead of a segment. The optical path along the segment B'C is inclined upwards. i.e. reaching the plane P2 of the projection lens 10 and this allows the insertion of the prisms 7 and 8 and of the image microforming device 9 with its relevant driving card, which components have considerable big overall dimensions, as previously said. In this instance, in fact, the above components can be easily positioned as they don't practically find no voluminous components in the underlying space, such as the integrating rod 4, which is now on the opposite side of the videoprojector 41 with respect to the dimension identified by the projection axis, whereby they have not to cross any portion of the optical path. Vice-versa, the projection lens 10, with a smaller vertical dimension, will overjump the optical path, whereby the whole videoprojector 41 can be manufactured with smaller vertical dimensions.

Figure 1A:
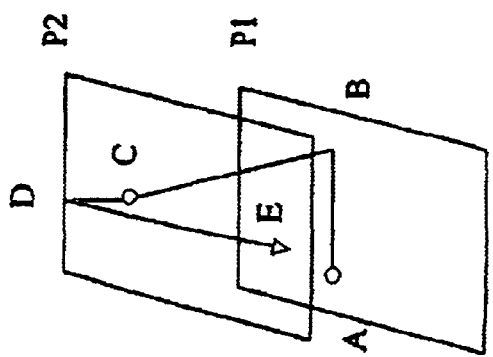
FIG. 1a shows a schematic perspective view of the optical path of the illumination system of FIG. 1.
Figure 1:
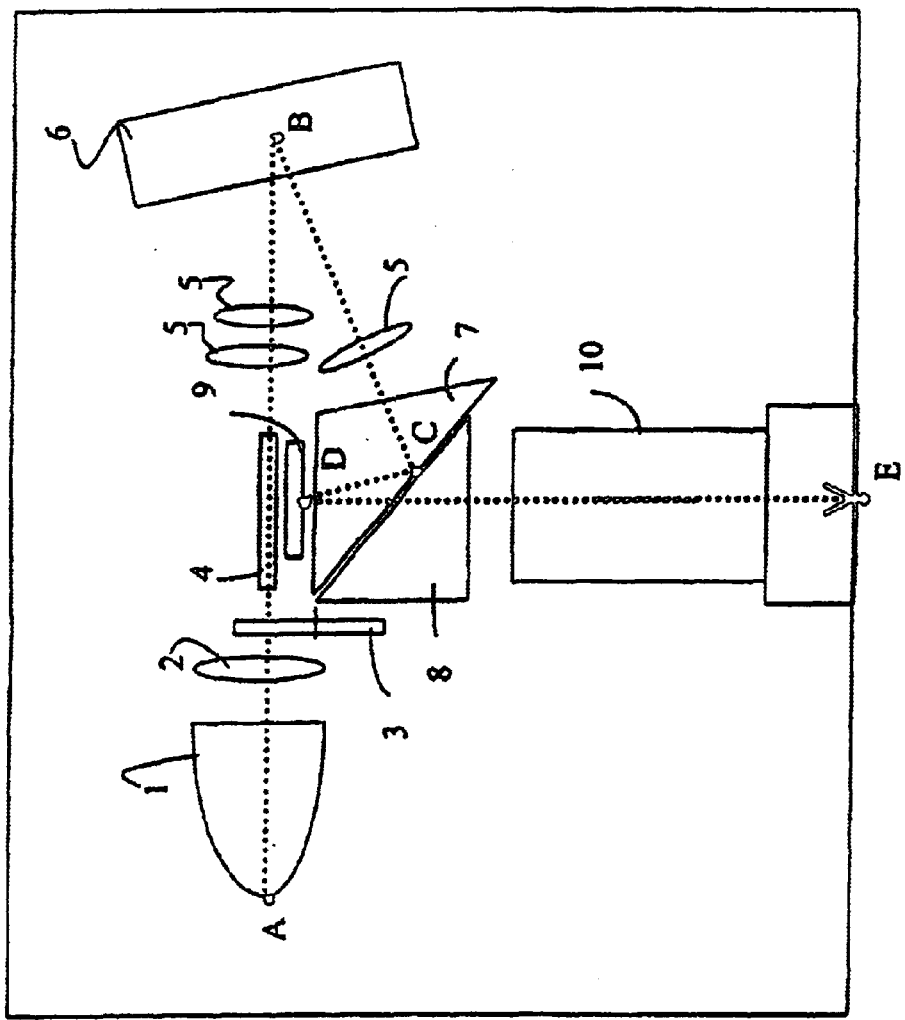
FIG. 1 shows a schematic plan view of a first known illumination system.

As a result, unlike the system of FIG. 1, upwards inclination of the segment B'C, bringing the optical path from the plane P1 to the plane P2, can be a restricted one, considerably reducing the vertical dimension of the videoprojector 41.

A third deflection of the optical path is produced by the TIR prism indicated with the number 7, already described above, which sends the light beam to the image microforming device 9 with the correct inclination represented by the segment CD. As illustrated in FIG. 1, the prism 8 sends the light beam from the image microforming, device 9 to the projection lens 10.

Figure 4:
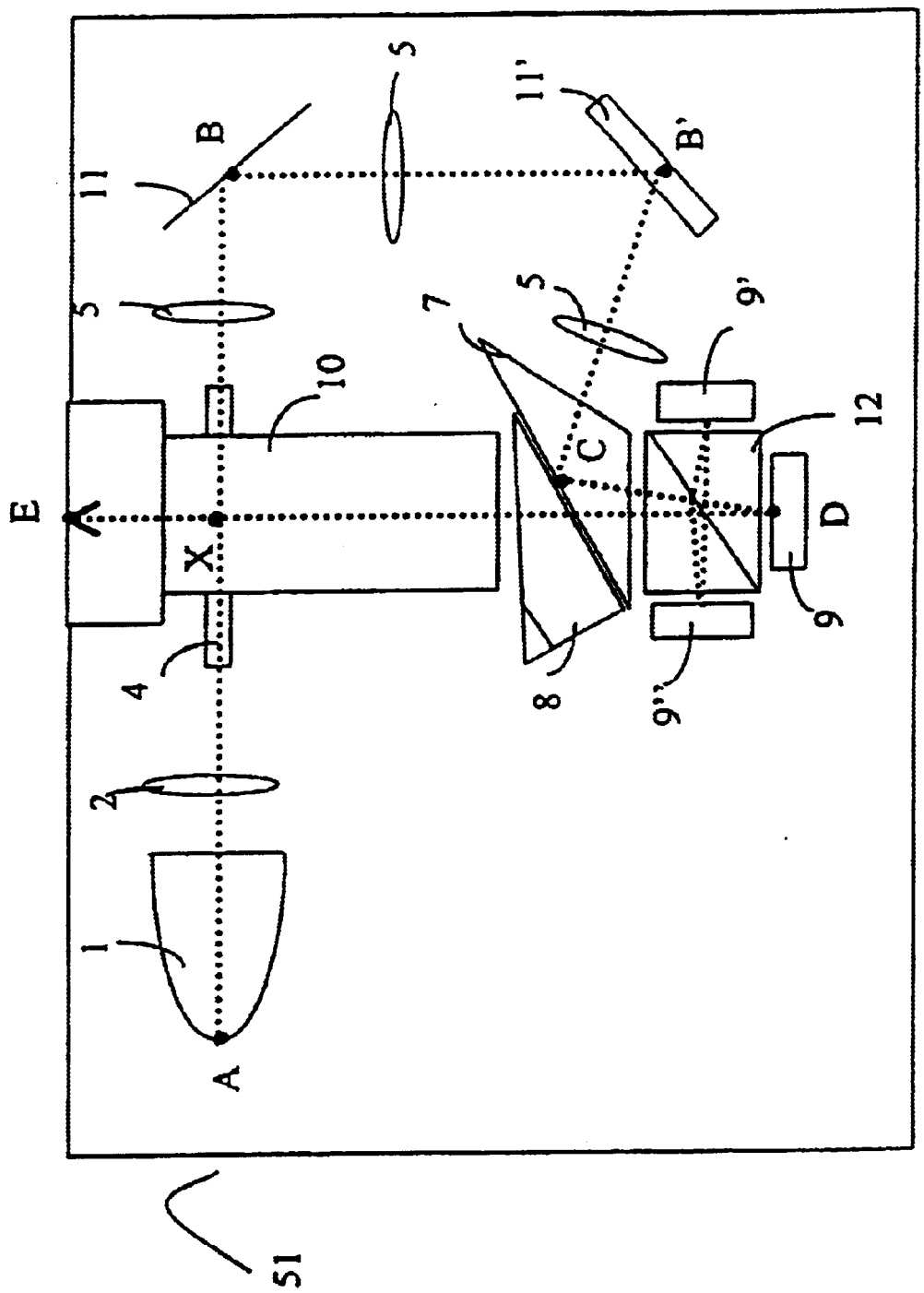
FIG. 4 shows a schematic plan view of an implementation of the illumination system according to the invention.

Due to the deflections produced by the mirrors 11 and 11', by the prism 7 and by the image microforming device 9, the projection axis, to which the segment DE is pertaining, will be parallel to the horizontal plane and substantially perpendicular to the segment AB, which pertains to the illumination axis of the lighting lamp 1. According to the above description, the videoprojector 41 can be used in a vertical position for the mirror back projection. Moreover, the projection of the optical path on the plane P1 will form a closed line, due to the segment AB intersecting with the projection of the segment DE on the plane P1 at an intersecting point X, whereby the closed path of FIG. 4 is identified by BB'CDX. Therefore, the size of the videoprojector 41 in the direction of the projection axis along the segment DE will be a restricted one.

The output light beam from the integrating rod 4, is focused by the three converging lenses indicated with the number 5 (relay lens), on the image microforming device 9, according to the Abbe's configuration previously mentioned. Since the image appearing on the image microforming device 9 is big enough and the light rays reaching the input of the projection lens 10 are divergent ones, said projection lens 10 can be shifted in a vertical direction of a small distance. ±6 mm, to ensure image centering (offset) on the screen 22.

From the above description it is clear how the diagram of the suggested optical path will allow the manufacture of a small size videoprojector, which can be used in any configuration.

The videoprojector 41 illustrated in FIG. 3 is represented with one DMD device alone, but the system can be utilized in a videoprojector employing two DMD devices or three DMD devices, as shown for a videoprojector 51 illustrated in FIG. 4.

In this event, the colour wheel 3 of FIG. 3 will not be used for obtaining colour images but the light beam from the prism 7 is split in its three primary components. i.e. red, green and blue by a prism indicated with the reference number 12. Each one of these three components is sent to one of three image microforming devices 9, 9', 9" with a correct angle shot and reflected back to the prism 12, which will reset the light beam and send it to the projection lens 10 through the prisms 7 and 8.

From the above description the features of the present invention as well as the relevant advantages thereof are clear.

Advantageously, the illumination system according lo the invention allows the manufacture of a videoprojector utilizing a DMD device according to Abbe's configuration, avoiding any optic and mechanical interferences between the components. This will advantageously allow manufacture of a videoprojector with restricted horizontal and vertical dimensions, it hinders that the beam emitted by the lamp, and in particular the integrating rod, are near to the prisms and the control electronics of DMD devices, but rather, in particular, the integrating rod and the DMD device within the space provided by the videoprojector are located on the opposite extremes with respect to the axis defined by the projecting direction.

Moreover, such a videoprojector can also be advantageously used in a back projection configuration.

It is obvious that many changes are possible for the man skilled in the art to the illumination system described above by way of example, without departing from the novelty spirit of the innovative idea, and it is also clear that in practical actuation of the invention the components may often differ in form and size from the ones described and be replaced with technical equivalent elements.

For example, the reflecting surface 11 can be manufactured with a "cold minor" type instead of a simple mirror, which minimizes the light heating effect removing the rays with a wavelength exceeding visible limits, in particular infrared rays; as a result, a smaller amount of heat will reach the DMD device, which requires less cooling.

I claim:

1. An illumination system for videoprojector, which comprises a lighting lamp, which emits a light beam along a first optical axis and a projection lens crossed by said light beam along a second optical axis, said first optical axis and second optical axis pertaining respectively to a first plane and to a second plane different from said first plane, optic deflection means and optic handling means for guiding the light beam along an optical path that comprises the first optical axis and the second optical axis, wherein the light beam along the first optical axis, between the projection lamp and a first reflecting surface in said optic deflection means, passes underneath the projection lens.

2. An illumination system for videoprojector, according to claim 1 wherein said first optical axis and second optical axis pertaining to a first plane and second plane, respectively are not substantially parallel to each other in that said light beam is guided along an optical path by the optic deflecting means that shift said light beam from the first plane to the second plane and by the optic handling means that shift said light beam from the first optical axis to the second optical axis.

3. An illumination system for videoprojector, according to claim 2, wherein said optic handling means comprises an image forming device.

4. An illumination system for videoprojector according to claim 3, wherein the geometric projection of the optical path of the first plane comprises a closed path and the first optical axis and the projection of the second optical axis on the first plane have an intersecting point pertaining to said closed path.

5. An illumination system for videoprojector according to claim 4, wherein said intersecting point pertains to the projection of the projection lens on said first plane.

6. An illumination system for videoprojector according to claim 3, wherein said light beam is focused on the image forming device through the optic handling means and lenses.

7. An illumination system for videoprojector according to claim 1, wherein the portion of the optical path on the first plane provides a reflecting surface.

8. An illumination system for videoprojector according to claim 7, wherein said reflecting surface comprises a cold mirror.

9. An illumination system for videoprojector according to claim 7, wherein in the portion of the optical path on the first plane there is provided a second reflecting surface.

10. An illumination system for videoprojector according to claim 4, wherein the first plane is located underneath the second plane and the first optical axis passes underneath the second optical axis, and underneath the projection lens.

11. An illumination system for videoprojector according to claim 4, wherein said projection lens can be shifted in a vertical direction by a small distance.

12. An illumination system for videoprojector according to claim 1, wherein the optical handling means comprises a plurality of image forming devices.

13. An illumination system for videoprojector according to claim 10 wherein the optic handling means comprises a prism for chromatic splitting.

14. An illumination system for videoprojector according to claim 3, wherein the image forming device comprises a digital micromirror device.

15. An illumination system for videoprojector according to claim 4, wherein said light beam is focused on the image forming device through the optic handling means and lenses according to a critical illumination diagram or Abbe's diagram.

16. An illumination system for videoprojector according to claim 1 wherein said videoprojector has the projection of the first optical axis and an image microforming device arranged at substantially extreme opposed positions along the second optical axis with respect to the dimensions of the videoprojector.

* * * * *